United States Patent
Berman et al.

(10) Patent No.: US 12,135,218 B2
(45) Date of Patent: Nov. 5, 2024

(54) METHOD AND SYSTEM FOR DYNAMICALLY NAVIGATING ROUTES ACCORDING TO SAFETY-RELATED RISK PROFILES

(71) Applicant: MITRE Corporation, McLean, VA (US)

(72) Inventors: Kathleen B. Berman, McLean, VA (US); Brian T. Simmons, McLean, VA (US)

(73) Assignee: MITRE Corporation, McLean, VA (US)

( * ) Notice: Subject to any disclaimer, the term of this patent is extended or adjusted under 35 U.S.C. 154(b) by 0 days.

(21) Appl. No.: 18/217,190

(22) Filed: Jun. 30, 2023

(65) Prior Publication Data

US 2024/0003697 A1     Jan. 4, 2024

Related U.S. Application Data

(63) Continuation of application No. 17/188,964, filed on Mar. 1, 2021, now Pat. No. 11,725,955.

(51) Int. Cl.
*G01C 21/34*     (2006.01)
*G01C 21/36*     (2006.01)

(52) U.S. Cl.
CPC ..... *G01C 21/3484* (2013.01); *G01C 21/3407* (2013.01); *G01C 21/3661* (2013.01); *G01C 21/3691* (2013.01)

(58) Field of Classification Search
CPC ............. G08G 1/096827; G08G 1/012; G08G 1/0129; G08G 1/017; G08G 1/0112;
(Continued)

(56) References Cited

U.S. PATENT DOCUMENTS 10,830,605 B1 * 11/2020 Chintakindi ....... G01C 21/3484
2010/0036599 A1 * 2/2010 Froeberg ............ G01C 21/3461
                                                                       701/532

(Continued)

FOREIGN PATENT DOCUMENTS

CN          105469167 A * 4/2016
WO    WO-2020093701 A1 * 5/2020 ............. G06Q 10/04
WO    WO-2021076099 A1 * 4/2021 ............. G01C 21/34

*Primary Examiner* — Rami Khatib
(74) *Attorney, Agent, or Firm* — Jones Day

(57) ABSTRACT

Systems and techniques by which a navigation system provides directional information for vehicular travel that is customized based upon real-time conditions, a safety profile associated with a vehicle driver, and the safety assessment associated with the characteristics of road segments are disclosed. In one implementation, a method for a personalized vehicular navigation assessed dynamically based on risk tolerance includes retrieving data indicative of accident history associated with at least one of the road segments, retrieving data indicative of real-time condition of the road segments, and retrieving a user profile associated with the user. The method further includes calculating risk scores, based on the accident history and the real-time conditions and weighed based on tolerance level and the driver's history, associated with a plurality of proposed routes, identifying a personalized route based on the risk scores, and transmitting the identified personalized route to a device. The calculation of the risk scores includes combining, using a statistical inference method such as an Empirical Bayes method, the accident history and a statistical regression model based on features of a road segment to compute a likelihood of having an accident on the road segment.

20 Claims, 8 Drawing Sheets

(58) Field of Classification Search
CPC ............ G01C 21/3461; G01C 21/3492; G01C 21/3605; G01C 21/26; H04W 64/003; H04W 64/006; B60W 60/001
See application file for complete search history.

(56) References Cited

U.S. PATENT DOCUMENTS

| | | | | |
|---|---|---|---|---|
| 2018/0059687 | A1* | 3/2018 | Hayes | G08G 1/096816 |
| 2019/0383621 | A1* | 12/2019 | Isaacs | G06Q 50/40 |
| 2020/0003569 | A1* | 1/2020 | Polanowski | G01C 21/3697 |
| 2020/0333791 | A1* | 10/2020 | Inoue | B60W 30/0956 |
| 2022/0034678 | A1* | 2/2022 | Chintakindi | B60W 60/0051 |
| 2022/0187085 | A1* | 6/2022 | Luciani | G01C 21/3415 |

* cited by examiner

METHOD AND SYSTEM FOR DYNAMICALLY NAVIGATING ROUTES ACCORDING TO SAFETY-RELATED RISK PROFILES

CROSS REFERENCE TO RELATED APPLICATION

This application is a continuation of U.S. application Ser. No. 17/188,964, filed Mar. 1, 2021. The foregoing related application, in its entirety, is incorporated herein by reference.

BACKGROUND OF THE INVENTION

When driving in unfamiliar geographical areas or venturing to new destinations, it is common for drivers to use a navigation system for obtaining a set of directions or for point-to-point navigation. Navigation systems typically are in the form of dedicated handheld units, software-based applications that execute on GPS-enabled mobile phones, or units integrated into audio/information/interfaces on vehicle dashboards. Navigation systems may be pre-programmed with geographical maps of roadways or the maps may be downloaded from an Internet server as routes are being navigated. The systems typically include or utilize GPS receivers to determine a vehicle's real-time geolocation and enable the system to track a vehicle's movement along a route.

Navigation systems determine routes based on inputs of starting and ending locations by identifying a vehicle's present or driver provided location as origin and using driver provided intended destination. From these inputs, the systems utilize mapping-related data indicating the locations, spans, and interconnections of roadways to generate a plurality of pathways by which a vehicle could travel from the starting location to the ending location. Each pathway may comprise a plurality of roadways, or portions thereof, which are segments that are linked or combined to form a route. To complete a route, a driver operates the vehicle by entering and exiting roadways to travel each segment in a designated order. The navigation system monitors the vehicle's travel progress and recalculates the route by identifying different roadways or directions if the vehicle bypasses, detours, or otherwise fails to travel each segment of the defined route.

Some navigation systems automatically determine a route based upon the shortest path. In this manner, the navigation system computes the distance associated with each segment for multiple possible routes and identifies the route with the segments having the shortest combined distance. Additionally or alternatively, navigation systems may be configured to identify a route based upon the quickest anticipated time of arrival. Typically, this is performed by associating each segment of a potential route with a time estimate, based upon an established maximum speed limit, typical known speed of traffic, or real-time traffic information, and identifying a route with the segments having the shortest combined amount of time required for travel.

Additionally, some navigation systems enable a vehicle driver to specify preferences, such as a desire to avoid highways or maximize highway travel. This provides an additional set of criteria by which the navigation system compares a plurality of identified potential routes. For example, if a preference is identified for maximizing highway travel, then potential segments for the route that use highways are selected in favor of local roadways.

SUMMARY

The present disclosure is directed to systems and techniques by which a navigation system provides directional information for vehicular travel that is customized based upon real-time conditions, a safety profile associated with a vehicle driver, and the safety assessment associated with the characteristics of road segments.

In one example, a method is described for a personalized vehicular navigation assessed dynamically based on risk tolerance includes receiving a navigation request from a user. The request includes a destination location input by the user and a detected origin location associated with the user. The method further includes identifying a plurality of routes from the origin to the destination. A route includes a plurality of road segments. The method further includes retrieving data indicative of accident history associated with at least one of the road segments, retrieving data indicative of real-time condition of the road segments, and retrieving a user profile associated with the user. The user profile includes a user-configurable tolerance level and a driver's history that factors experience and past traffic incidents. Additionally, the method includes calculating risk scores, based on the accident history and the real-time conditions and weighed based on tolerance level and the driver's history, associated with a plurality of proposed routes, identifying a personalized route based on the risk scores, and transmitting the identified personalized route to the device. The calculation of the risk scores includes combining, using a statistical inference method such as an Empirical Bayes method, the accident history and a statistical regression model based on features of a road segment to compute a likelihood of having an accident on the road segment. In another example, a navigation system for personalized routing includes one or more processors configured to receive a navigation request from a user. The request includes a destination location input by the user and a detected origin location associated with the user. The processors are further configured to identify a plurality of routes from the origin to the destination, wherein a route includes a plurality of road segments, retrieve data indicative of accident history associated with at least one of the road segments, retrieve data indicative of real-time condition of the road segments, and retrieve a user profile associated with the user. The user profile includes a user-configurable tolerance level and a driver's history that factors experience and past traffic incidents. Additionally, the processors are configured to calculate risk scores, based on the accident history and the real-time conditions and weighed based on tolerance level and the driver's history, associated with a plurality of proposed routes, identify a personalized route based on the risk scores, and transmit the identified personalized route to the device. The calculation of the risk scores includes combining, using a statistical inference method such as an Empirical Bayes method, the accident history and a statistical regression model based on features of a road segment to compute a likelihood of having an accident on the road segment.

In yet another example, a non-transitory computer-readable storage medium storing code is described that, when executed, causes a computer to perform the steps of receiving a navigation request from a user. The request includes a destination location input by the user and a detected origin location associated with the user. The steps further include identifying a plurality of routes from the origin to the destination, wherein a route includes a plurality of road segments, retrieving data indicative of accident history associated with at least one of the road segments, retrieving data indicative of real-time condition of the road segments, and retrieving a user profile associated with the user. The user profile includes a user-configurable tolerance level and a driver's history that factors experience and past traffic incidents. Additionally, the steps include calculating risk scores, based on the accident history and the real-time conditions and weighed based on tolerance level and the driver's history, associated with a plurality of proposed routes, identifying a personalized route based on the risk scores, and transmitting the identified personalized route to the device. The calculation of the risk scores includes combining, using a statistical inference method such as an Empirical Bayes method, the accident history and a statistical regression model based on features of a road segment to compute a likelihood of having an accident on the road segment.

DETAILED DESCRIPTION

Figure 1A:
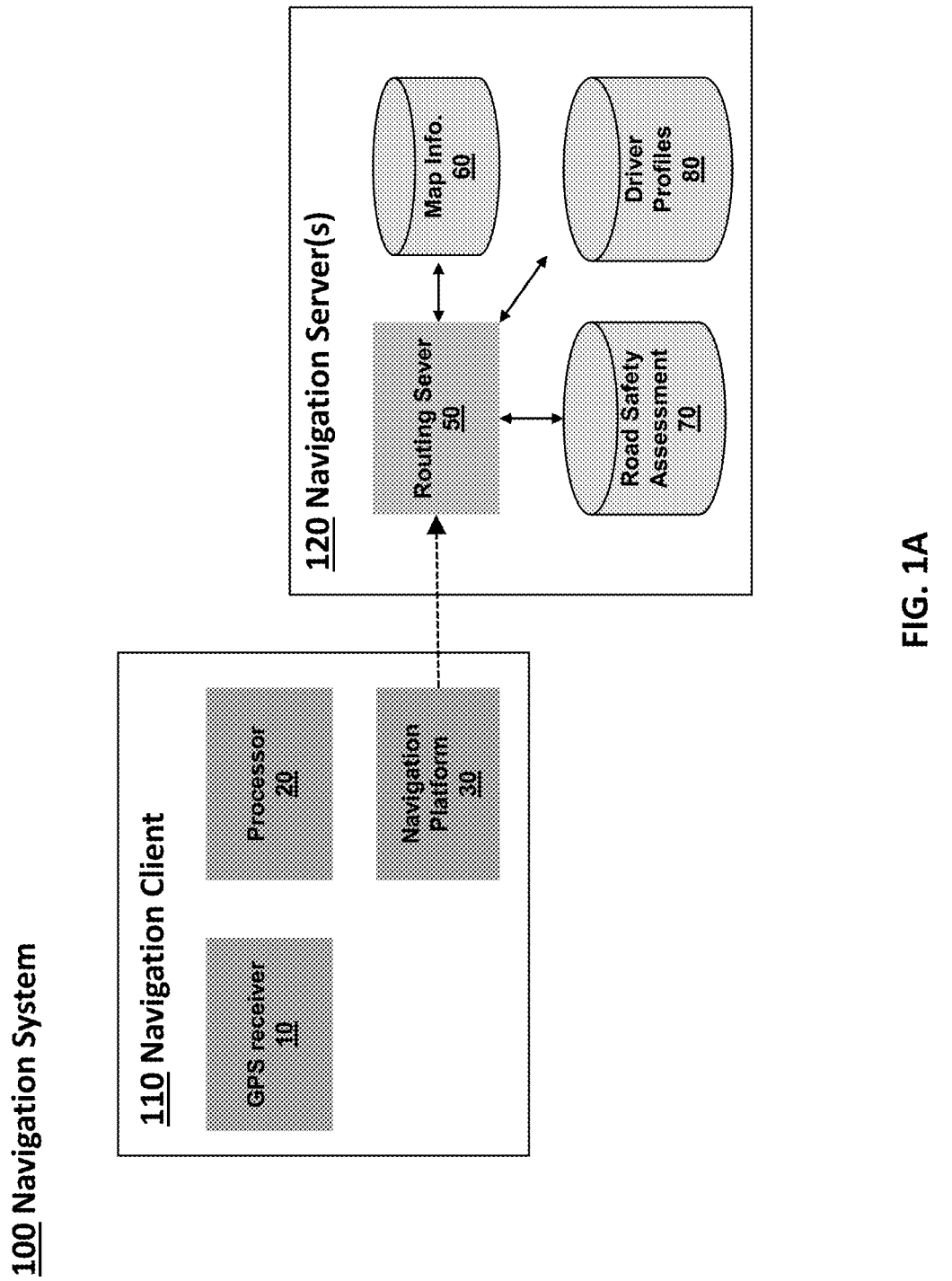
FIG. 1A is a block diagram illustrating a configuration of an apparatus for performing risk assessment in computing navigation according to an embodiment of the present disclosure.

When driving, some routes are safer than other ones. As examples, some routes have fewer left turns, some roads have no shoulder, some have construction zones, some are likely to have children playing in the street, some provide clear visibility during the day but are more treacherous at night, and some are prone to flooding during rain. Drivers often modify their routes to avoid hazards when driving to and from familiar destinations, but when driving in less familiar areas, they do not have the benefit of experience. Existing driving applications can suggest the "best" routes based on time and distance, but do not consider safety, particularly, real-time safety and safety from specific risks.

The present disclosure is directed to an improved method and system for routing that provides capabilities to reduce traffic accidents and fatalities by guiding drivers toward safer driving routes that are based on historical accident data (e.g., accident frequency) and can be determined dynamically with real-time conditions and can be tailored based upon a driver's needs, preferences, or skills. The suggested routes for a driver might vary according to the time of day, weather condition such as rain, drizzle, cloudy, partially cloudy, overfast. sunny/clear, snow, stormy, etc., and/or the level of precipitation. Likewise, the suggested routes may vary according to a driver's age, accident history, self-described profile, familiarity with the geographical area, and vehicle profile. The improved routing method and system may consider some or all of these criteria as factors for providing drivers with safety risk assessments that are associated with various routes. The driver can use the safety risk assessments to understand the trade-offs among the routes and in particular consider how safe a route is instead of making decisions based solely on travel time/distance.

The improved routing system and method leverages known technologies for GPS-based navigation for vehicles. For example, the system and method utilizes data transmitted from navigational satellites to terrestrial GPS receivers for determining a vehicle location in known ways, and also utilizes known mapping tools, either maintained in local storage or communicated wirelessly via a server. Additionally, the present system and method utilizes known routing and navigation algorithms to identify road segments that can be incorporated into potential routes based upon the vehicle's present location and the target destination. But unlike conventional navigation applications, the improved routing system and method additionally maintains a driver's safety profile, which may be periodically or continually updated, manually or automatically. The system and method also access data pertaining to road conditions and safety conditions associated with roads and incorporates this information along with the driver's safety profile as inputs to a computational process for determining suggested routes.

Embodiments of the present disclosure will be further described with reference to the accompanying figures.

FIG. 1A illustrates an example configuration of a navigation system 100 for performing risk assessment in computing navigation. The navigation system 100 includes a navigation client 110 (e.g., a smart phone, dedicated automobile navigation device, smart watch, etc.) and one or more navigation servers 120. Navigation client 110 includes a GPS receiver 10, a processor 20, and a navigation platform 30. Navigation platform 30 is configured to provide routing instructions (e.g., visual- and/or audio-based) to users of navigation client 110. Users may also use navigation platform 30 to provide inputs for configuring the platform (e.g., entering information for inclusion as driver profile such as age, experience etc.) and/or operating the platform (e.g., destination).

In the example of FIG. 1A, navigation platform 30 is communicatively coupled (e.g., via the Internet) with a routing server 50 external to navigation client 110. Routing server 50 may be a part of a collection of navigation servers 120 that support the operation of navigation client 110. Routing server 50 is configured to provide navigation platform 30 with one or more potential routes to a destination (e.g., routes with varying distances, levels of risk scores, estimated travel time). Based on the information provided by routing server 50, navigation platform 30 may present the one or more routes to its user (e.g., visually on a screen of navigation client 110), from which the user can choose a route for navigation. As will be described below, routing server 50 is configured to use driver profile, road safety assessment data, various map information, or a combination thereof to identify the potential routes. Accordingly, routing server 50 may be communicatively coupled to data sources containing such information (e.g., map info 60, road safety assessment 70, and driver profile 80 As shown in FIG. 1A, these data sources may be external to routing server 80 (e.g., in a different physical or virtual server). In some embodiments, one or more of these data sources may be a third-party data source. After the user selects a route, navigation platform 30 may provide turn-by-turn navigational instructions to the user for the chosen route (e.g., using visual and/or audio turn-by-turn instructions).

Figure 1B:
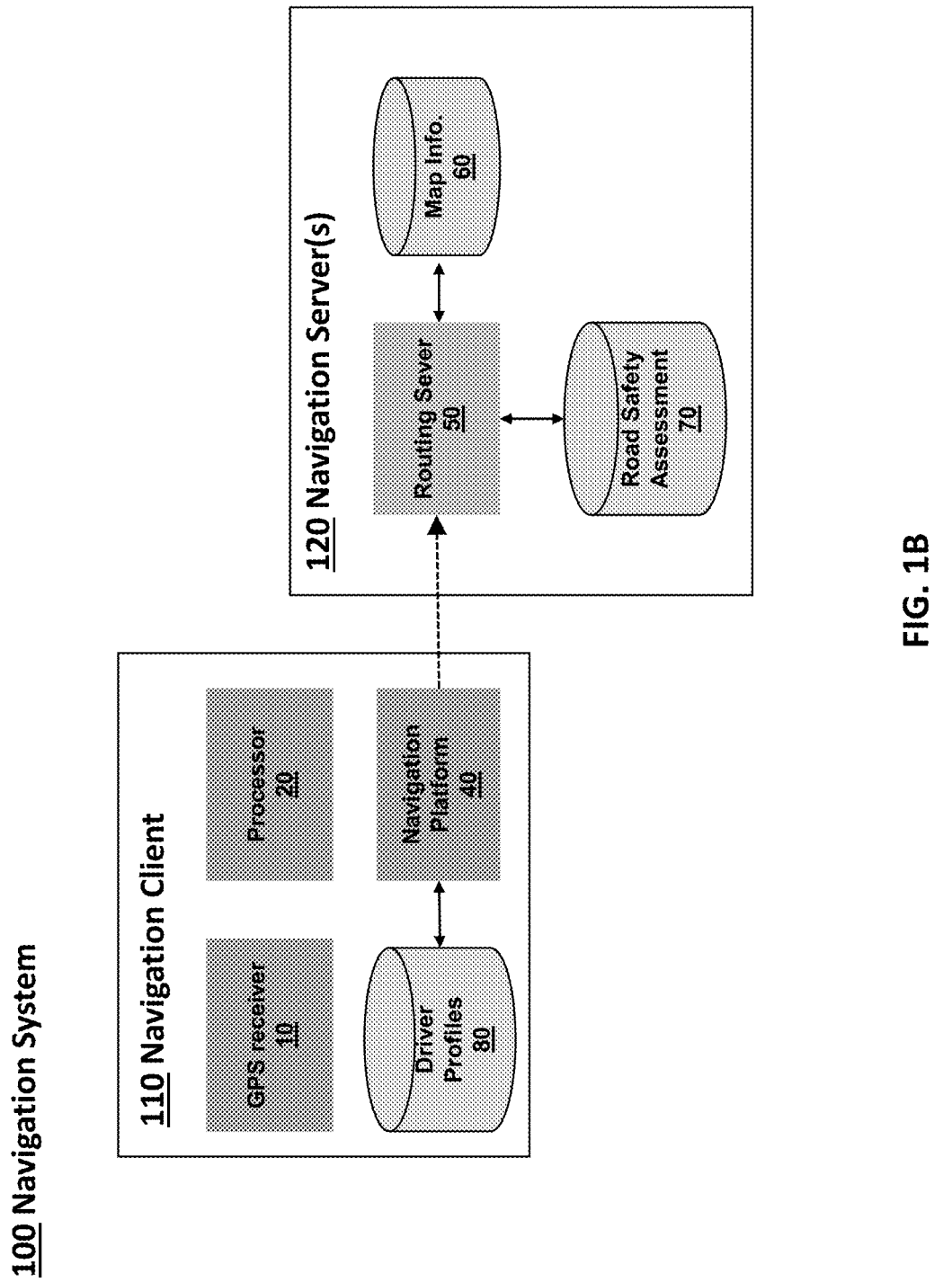
FIG. 1B is a block diagram illustrating another configuration of an apparatus for performing risk assessment in computing navigation according to an embodiment of the present disclosure.

In some embodiments, as shown in FIG. 1B, some of the information used to identify the potential routes may be stored locally in navigation client 110 (e.g., driver profiles). In these embodiments, routing server 50 may identify, and provide to navigation platform 30, a set of potential routes based on the information available to the server 50. Subsequently, navigation platform 30 may use the additional information available locally (e.g., driver profiles) to identify and present, to the user, a subset of the potential routes provided by routing server 50. Alternatively, or additionally, in some embodiments, navigation platform 30 may provide routing server 50 with the information that is available locally. Routing server 50 may use the information provided by navigation platform 30 (e.g., driver profile) and information available from road safety assessment 70 and map information 30 to identify the potential routes. The potential routes are then provided to navigation platform 30, which are then presented to the user of navigation client 110 for selection.

In FIGS. 1A and 1B, Map Information 60 is a data source for information pertaining to roads in a geographical region. In some embodiments, multiple data sources may be utilized by routing server 50. For example, one data source may be associated a geographical region and another data source may be associated with a different geographical region. Such information enables routing server 50 to identify one or more sets of "road segments" (i.e., one or more routes) that connect an origin to a destination. The road safety assessment 70 contains baseline safety risk scores and their crash multiple factors under various conditions which will be described below. This database is processed and standardized using data from federal, state or local transportation agencies and may be updated periodically (e.g., by routing server 50), as an update becomes available, manually, or a combination thereof.

The driver profile 80 may include information pertaining to, for example, the driver's' age, eyeglass prescription, driving records, accident records, criminal records, insurance information, driving experience, route familiarity, risk tolerance, and driver preferences. The risk tolerance specifies the driver's preferred tradeoff between safety and travel time. It may include, for example, choosing the safest route regardless of travel time, choosing the safest route that is at most twice as the fastest route, or choosing the safest route that is at most 50% longer than the fastest route. The driver preferences may include, for example, preferences for various types of roads (e.g., local, highway), preference for avoiding (i.e., tolerance for) various types of road conditions/hazards, and/or preferences for avoiding roads with user-configurable threshold levels of past accidents (e.g., based on frequency, severity, and/or type) on routes. The preferences can specify that a certain type of roads, road conditions/hazards, and certain type of past accidents are permitted or prohibited. Alternatively, or additionally, the preferences can specify the degree of preference or an order of preference so that systems and methods can perform comparisons.

This data may be entered manually into the navigation system and/or it may be obtained via a communications interface with a mobile phone associated with the driver, or via one or more remote servers. For example, a driver profile can be generated from information concerning the driver maintained by state driver's licensing or Department of Motor Vehicle databases, or in insurance company databases. Additionally, or alternatively, the driver may enter information manually through prompts on a website via a mobile telephone or a networked computer, and the navigation system can be preconfigured to receive or pull this data. The navigation system also can be configured to check for updates on this information at predetermined intervals, or perhaps on demand when a driver accesses a navigation system for a suggested route.

As an example, after a driver becomes involved in an automobile accident, the driver's automotive insurance company may add an entry in the insurance company's database that identifies the automotive accident, including the location, date and time, type and severity of damage, estimated speed, etc. Routing server 50 may be configured to then access this record via communication with the insurance company's remote server and incorporate the data for computing the driver's risk profile (e.g., stored in driver profiles 80). As described below, the system may then utilize this information as a factor when determining suggested routes. For example, the system may suggest routes that avoid the road segment where the driver's accident occurred. More generally, the system may suggest routes that avoid road segments that are similar to that road segment in terms of the type of potentially dangerous condition. The improved method and system for driver navigation may be configured to receive the driver's license number and use that information to access the driver's state driving records. As yet another example, the method and system may be configured to receive profile information and preferences provided by the driver's parent or guardian, and utilize that information as a factor for computing suggested routes.

By receiving driver-specific information, either directly from the driver, from his/her parent or guardian, or from databases that maintain data concerning the driver's record, a profile can be manually or automatically generated that accounts for the driver's level of skill, risk tolerance, or preferences. In some embodiments, a proposed profile can be generated that a driver can evaluate and then confirm or adjust.

In some embodiments, driver profiles may be entirely or partially retrieved from a third party server/data source, such as a state-run department of motor vehicles (DMV) database or another repository that maintains data associated with the driver.

In some embodiments, as shown in FIG. 1B, driver profiles may be entirely or partially stored in, and retrieved from navigation client 110. For example, a driver profile associated with a particular user(s) may be stored in navigation client 110 associated with that user. In another example, a portion of a driver profile associated with a user may be stored in navigation client 110. The portion of the driver profile may include, for example, any private information that the driver would be unwilling to share for various reasons. As an example, a driver may wish to keep the driver's preference for routes private because of the fear that such information may be provided to insurance companies, potentially raising the insurance premium. In some embodiments, the user of navigation client 110 may select the portion of driver profile to be stored locally in navigation client 110 (or other devices owned by the user) or remotely in navigation server 120.

Figure 2:
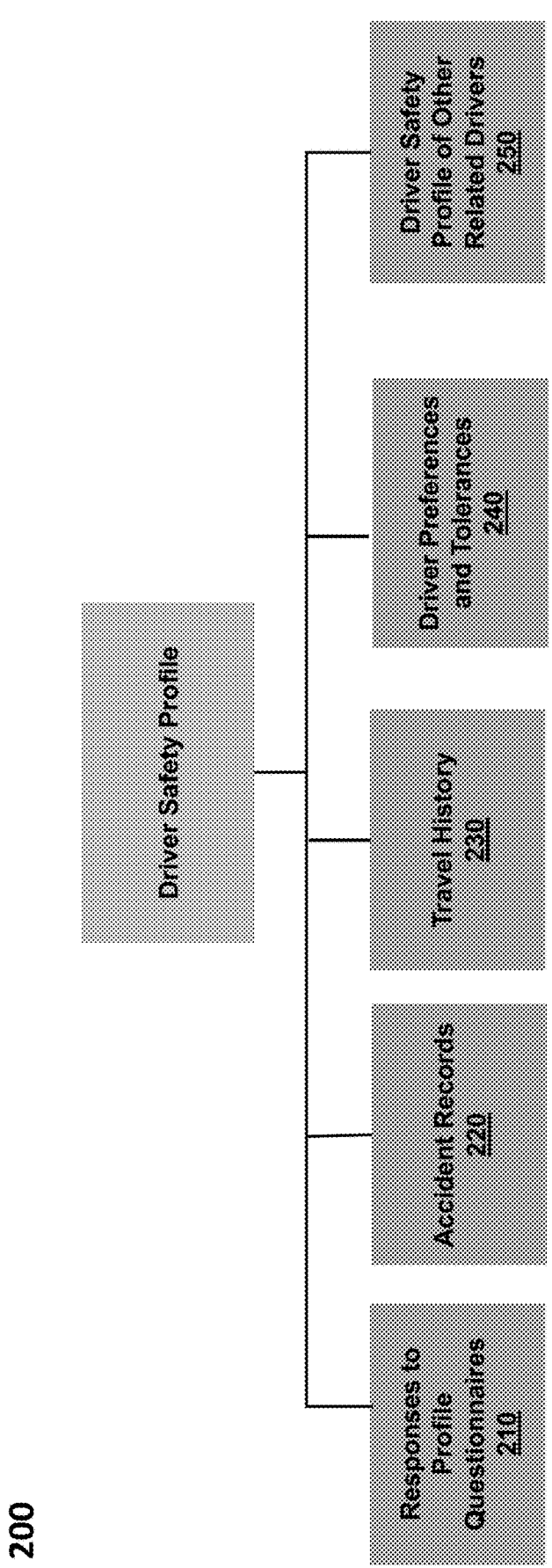
FIG. 2 provides an example of a database schema for tracking drivers' risk profiles according to an embodiment of the present disclosure.

FIG. 2 illustrates an example database schema 200 of a driver's safety profile (e.g., stored in Driver Profiles 80 of FIG. 1A/B), according to an embodiment of the present disclosure. The schema may include the driver's responses to a profile questionnaire 210, the driver's accident records 220, travel history 230 (of routes taken over the past year), and driver preferences/tolerances 240. If the navigation system is installed as part of a vehicle, the schema may include similar entries 250 for every driver listed on the insurance policy for the vehicle. In other embodiments, the schema is maintained in a cloud server that can be remotely accessed by the navigation system before computing a suggested route.

The responses 210 may include information about the driver in some embodiments. For example, the responses 210 may include the driver's age, age group, gender, knowledge of the local roads (e.g., based on the driver's driving history in the region and/or based on travel history 230), and/or driving skill level/experience. The responses 210 may include information about the vehicles that the driver owns, leases, and/or otherwise frequently drives, such as vehicles' make/model/year and mileage information. The accident records 220 may include data indicative of past accidents in which the driver was involved. Such data may include, for example, accident type, cause of the accident, and accident time/date. The driver preferences and tolerances 240 may identify the type of roads, weather, and/or hazard that the driver prefers to avoid. Such information may be included as a binary preference (i.e., avoid or permit) and/or as a relative preference (e.g., as a value corresponding to a level of preference or as a list in the order of preference).

Figure 3:
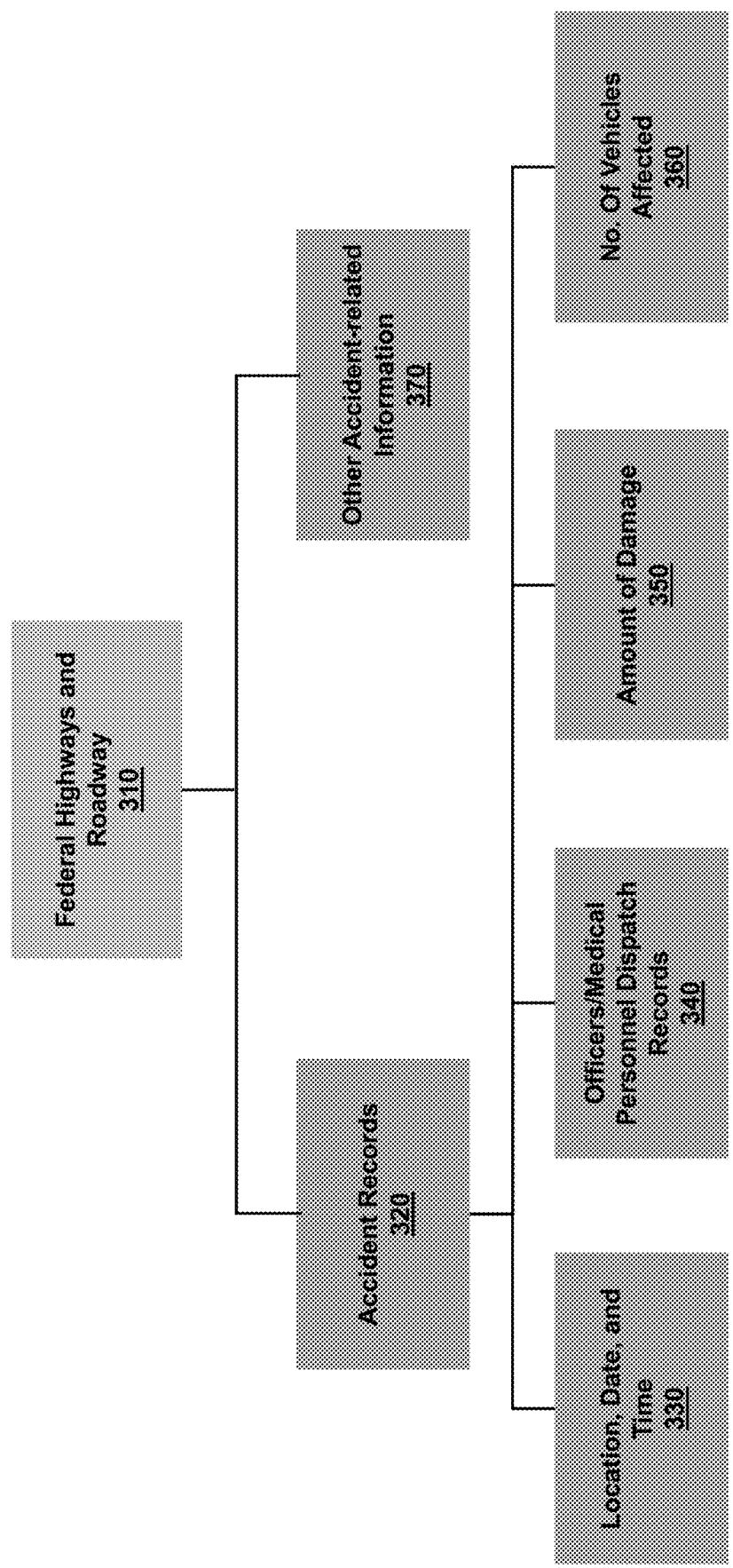
FIG. 3 provides an example of a database schema for tracking road safety information according to an embodiment of the present disclosure.

FIG. 3 illustrates an example database schema 300 of information that may be maintained, for example, by the National Highway Traffic Safety Administration concerning road safety or state departments of police or transportation. The schema 300 may be used, for example, to compute road safety profile stored in Road Safety Assessment 70 in FIG. 1A/B. The schema includes a listing 310 of federal highways and roadways maintained with federal, state, or local funds and, for each, there is provided safety data including accident records 320 along with various data concerning each incident, such as the accident location, date and time 330, whether officers and/or medical personnel were dispatched 340, a description or classification of the amount of damage and injury type 350, the number of vehicles affected 360, and other accident-related information such as weather and light condition, drivers involved in the accidents (e.g., age group) 370.

Such a database or repository may be maintained by any or various federal, state, or local governmental agencies. Additionally or alternatively, the schema may be maintained by insurance companies.

Figure 4:
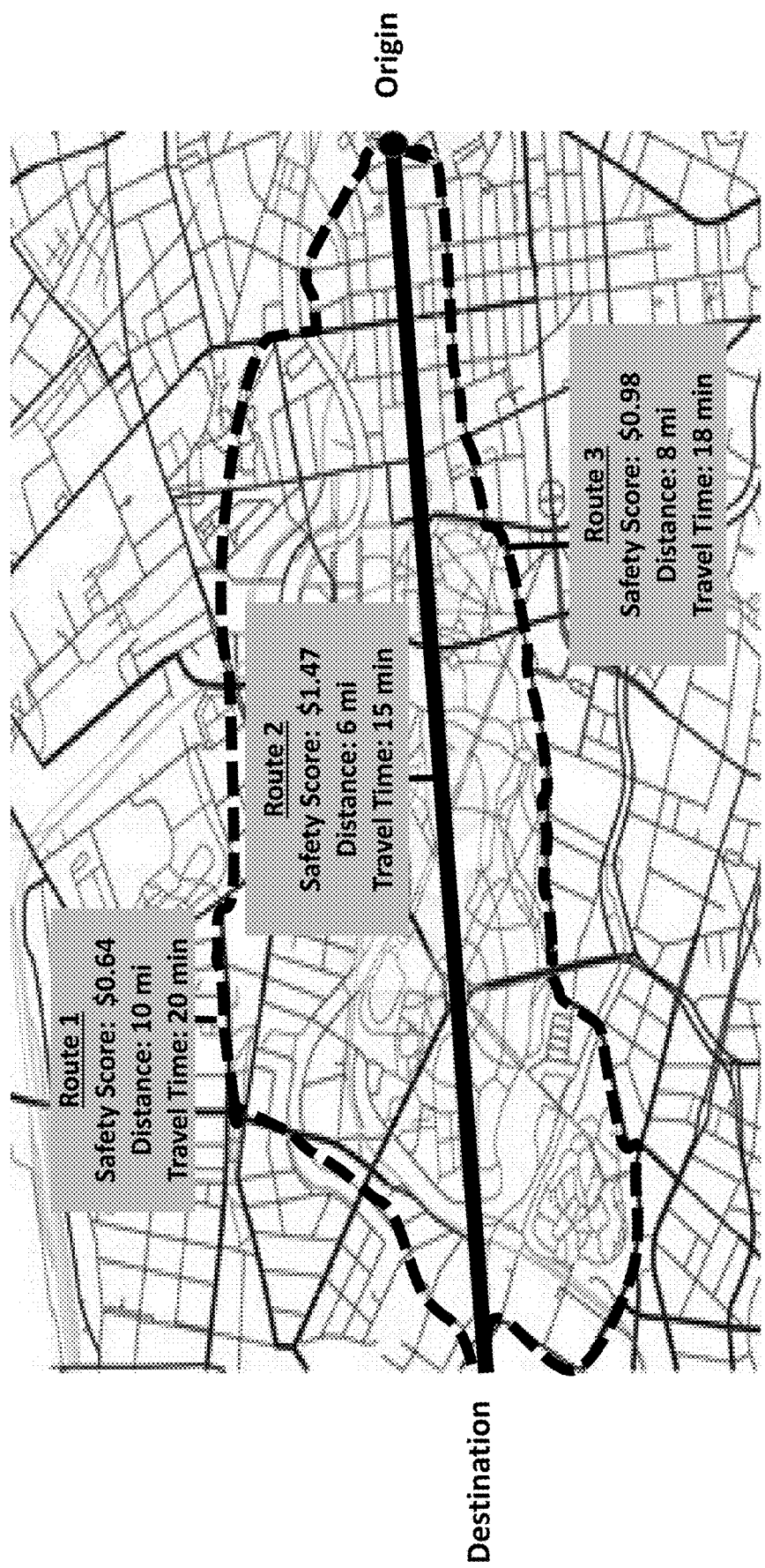
FIG. 4 illustrates an example graphical user interface for an improved navigation system according to an embodiment of the present disclosure.

The listing 310 may further include various information about roads involved in accidents, such as road name, direction, speed limit, number of lanes, lane widths, shoulder width, surface/pavement condition, whether it is located in rural, urban, or suburban area, whether it is a one way or two way road, number of opposite lanes, whether it is a toll road, average daily traffic, whether a ramp was involved, cost associated with the accident FIG. 4 depicts an example GUI for an improved navigation system in which the driver is presented with three possible routes, each with a unique, dynamically determined safety score based on the driver's safety profile. In some embodiments, after a driver provides a start/end point and configures the preferences, the GUI provides candidate roads along with their travel distance, time, and the overall safety score for all candidate routes. If the driver wants to know more about each route, the driver may for example select the route to view more details such as the types of risks/dangers, the number and type of accidents occurred historically under the similar conditions (e.g., based on the time of the day, day of the week, weather type) as well as turn-by-turn navigation with distance and safety score along the road.

In the example of FIG. 4, in addition to viewing a "score", a driver is enabled to click on a link to receive information providing a basis for the score. For each of the identified routes, the GUI can indicate, in addition to the safety score, the total distance and the estimated travel time or time of arrival. As an example, the GUI can provide a more specific description or analysis of the dangers along the roadway, or provide a zoomed-in area on the map or a picture indicating the location of the roadway. From this information, the driver can evaluate the amount of additional risk associated with a shorter commute to make an informed decision.

In an embodiment, for the selected route, the GUI can provide a visual or audible warning once the driver is at a location along a roadway that was deemed dangerous/less safe and was a basis that negatively impacted the safety score. As a further example, the dangerous portion of the roadway can be depicted in another color, or a flashing line, to provide a visual reminder for the driver be cautious.

When the improved navigational system is embedded in a vehicle that is operated by more than one driver, the system can easily switch between different drivers. As examples, a driver's profile can be associated with that driver's key fob, driver's setting, or Bluetooth connection. Continuing with the Bluetooth example, when a driver turns on the vehicle and his/her mobile device connects with the car's multimedia system via Bluetooth, the navigation system is automatically set to use the driver safety profile associated with the connected mobile device. In some embodiments, this is used to make a selection between different drivers' profiles stored in the navigation system. In other embodiments, the driver's safety profile is maintained on the driver's mobile device, and the navigation system accesses the profile via the Bluetooth connection when calculating a new route.

Figure 5:
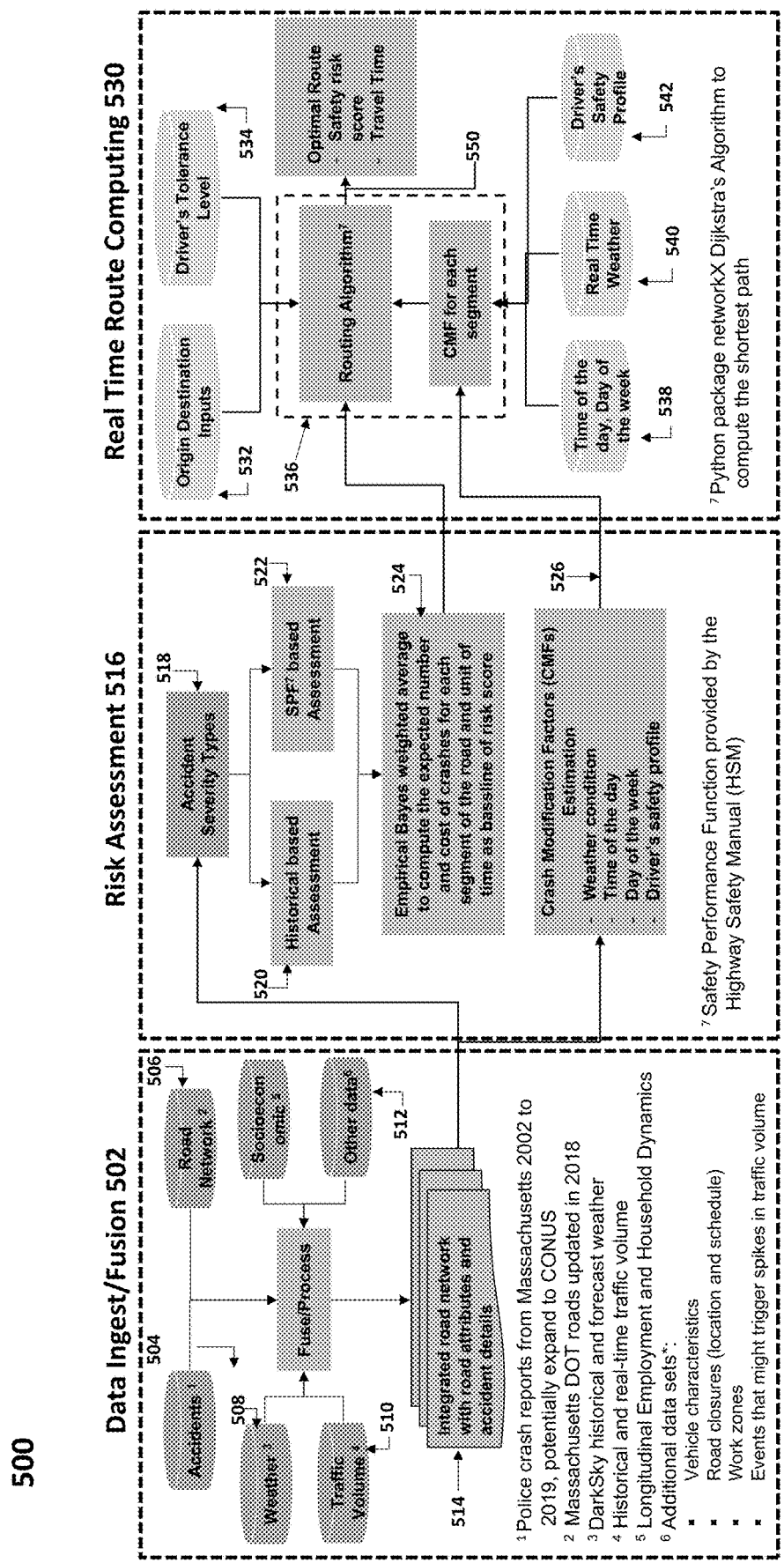
FIG. 5 is a block diagram illustrating a data flow of risk assessment information for using in a real-time route computing engine, according to an embodiment of the present disclosure.

FIG. 5 is a block diagram illustrating a data flow 500 for computing risk assessment information by a real-time route computing engine, according to an embodiment of the present disclosure. In the first stage, a data ingest/fusion process 502 includes collecting information pertaining to road safety from a plurality of sources. Such information can include, for example, accident information, weather, traffic volume associated with a given road segment.

In some embodiments, process 502 may be executed periodically. (e.g., every week/month). Alternatively, or additionally, process 502 may be performed in response to receiving an indication that data from the plurality of sources have been updated. In one example, process 502 may be executed by routing server 50 and/or navigation platform 30 of FIG. 1A/B.

As depicted in FIG. 5, the accident information may be retrieved from one or more databases 504 maintained by the federal, state, or local departments of police or transportation, insurance companies\ with schema described in FIG. 3.

For example, some state police agencies maintain databases with crash reports over periods of several years and are updated periodically.

Road network information can be obtained from databases 506 maintained, for example, by state-run Departments of Transportation. This may include information about every road maintained by that agency, such as the road's location, condition, and construction and repairs status. The Data Ingest/Fusion process also includes accessing historical weather information and/or weather forecasts from weather-related databases 508, such as DarkSky, the National Weather Service, and various agencies, news outlets, and other data sources that track historical weather information. During this process, traffic volume information is also retrieved from databases 510, which may be maintained based on cell phone data, other GPS-enabled services, state-level Department of Transportation (DOT), etc. Additionally, the process of data ingestion/fusion can retrieve data from other various sources 512, for example, to obtain information about road closures, work zone, special events that might trigger spikes in traffic volume. The accident severity level together with all other crash related policy report can be provided by a state-level Department of Transportation (DOT) through a data portal. This information can be organized and formatted in various ways. In some embodiments, the source accident data can be downloaded in a csv (comma-separated values) format. The source weather data can be retrieved as a JSON format and further parsed into a csv format. The road network including traffic volume can be downloaded as a shapefile and further processed into a csv format.

In the Fuse/Process, the improved navigation system ingests (i.e., retrieve and process) data from various formats, standardizes the data field names, contents, and formats, and links them based on road segments and accident IDs. The system generates, at step 514, an integrated road network database containing roads' attributes and details of accidents that occurred on the roads. As an example, this integrated road network database may include a record for each road segment in a particular section of a map including its geometric shape, location, attributes such as roadway types, the number of lanes, rural/urban area, one-way/two-way, divided or undivided lanes. Each road segment may also include the number of accidents occurred on the road segment and the detailed information such as described in FIG. 3 on each accident occurred. This information is subsequently retrieved for road segments that are candidates to be included in a suggested route.

In the second stage, a "risk assessment" 516 is performed based on the integrated road network information generated at step 514. The integrated road network information is first processed at Accident Severity Types 518, which determines the accident severity types for each accident or incident. For each accident severity type, the improved navigation system incorporates historical based assessments 520 and a Safety Performance Function (SPF) based assessments 522 provided by the Highway Safety Manual (HSM) to determine the likelihood of having an accident on a given road segment. Then, the system combines the assessments through a statistical inference method such as an Empirical Bayes weighted average method 522, which will be described below in further detail. In one example, risk assessment 516 may be executed by routing server 50 and/or navigation platform 30. Risk assessment 516 may be executed manually, periodically, or as data source is updated, for example.

Accident Severity Types 518 can be provided by the policy crash report using the "KABCO" scale, which is a standard requirement in all policy reported crash records. The "KABCO" injury scale was developed by the National Safety Council (NSC) and is frequently used by law enforcement for classifying injuries. KABCO stands for:

K—Fatal
A—Incapacitating injury
B—Non incapacitating injury
C—Possible injury
O—No injury Both historical and SPF based methods determine the baseline likelihood of having an accident on a given road segment. The baseline is the average or (other statistical value) extracted from conditions associated with all (or a relevant subset) of the crashes. The historical based assessment 520 uses the actual number of accidents occurred on the specific segment to predict the likelihood of future accidents and injuries if current vehicle accident trends are expected to continue. The SPF based assessment 522 is a statistical regression model to predict the likelihood of having an accident based on physical and operational variables, such as the roadway features described above. Historic accident data are not directly used to assess the risk for a specific segment but instead are used to estimate the parameters and coefficients of a statistical model.

The SPF calculation guidance from the Highway Safety Manual (see HSM) can be used for this purpose. In particular, the annual expected number of SPF-based crashes over segment i of crash severity type p over n years is computed as $$N_{i,p} = e^{\alpha} \times \text{AADT}_i \times \beta \times L_i \times n \qquad (2)$$

where
α,β are regression coefficients determined by the roadway features (described above)
$\text{AADT}_i$ is the average annual daily traffic volume (vehicles per day) on segment i
$L_i$ is the length of the segment measured in miles
n is the number of years of assessment Historical based assessment requires a long period of accidents data collection since roadway accidents are rare events. But, even long periods of time may not yield sufficient data for some road segments. Statistical assessment overcomes the shortage of data insufficiency but may fail to consider all factors that contribute to an accident. Hence, a statistical inference approach 524, such as an Empirical Bayes method, can be utilized. This method computes the weighted average number of crashes for each segment of road and unit of time between the expected number of crashes based on historical data and the expected number of crashes using SPF for the considered segment with similar roadway features. In the case of absent historical data, SPF assessment is given 100% weight. Specifically, the Empirical Bayes based expected number of crashes of crash severity type p at segment i over n years is computed as:

$$E(x_{i,p,n}) = w_{i,p} \times N_{i,p,n}^{SPF} + (1 - w_{i,p}) \times N_{i,p,n} \qquad (3)$$

where
$N_{i,p,n}^{SPF}$ the expected number of type p crashes using SPF Equation (2) above for segment i with similar roadway features
$N_{i,p,n}$ is the total number historical type p crashes occurred on segment i over n years
$w_{i,p}$ is the weight for the SPF component on segment i. This weight is computed as $$w_{i,p} = \frac{1}{1 + \frac{N_{i,p}^{SPF}}{v}} \quad (4)$$

where v is the dispersion of type p crash for the considered roadway features.

Lastly, the risk score on segment i is expressed as the cost per 100000 trips and computed as:

$$Risk_i = \frac{\sum_p (E(x_{i,p,n}) \times cost_p)}{365 \times n \times AADT_i} \times 100{,}000 \quad (5)$$

where
p is the crash severity type. This considers non-injury crash and injury crash
$E(x_{i,p,n})$ is the expected number of Type p crashes at segment i over n years calculate from Equation (3)
$cost_p$ is the expected economic cost of Type p crashes. Our current estimation is $8,700 for noninjury crashes and $427,000 for injury crashes.
n is the number of recorded accident data
$AADT_i$ is the average annual daily traffic volume (vehicles per day) on segment i To account for additional site-specific conditions such as rush hours, time of day, the day of the week, or severe weather conditions, that may differ from the average conditions, the improved navigation system further uses the integrated road network information 514 to fit statistical models for estimating different Crash Modification Factors (CMF s) 526. In other words, this engine is used (in the final stage, described below) to determine the customized and real-time risk score for each driver based upon driver profile and present conditions, including the current weather, time, and day.

The CMFs are estimated followed by the USDOT Federal Highway Administration (FHWA) "Guide to Developing Quality Crash Modification Factors". Currently, crash factors such as day or night (determined by actual sunset and sunrise time), month of the year, weather conditions (rainy, sunny, snow), and roadway features (roadway types, the number of lanes, rural/urban area, one-way/two-way, divided or undivided lanes) are used to fit Zero Inflated Poisson distribution and Zero Inflated Negative Binomial distribution. Then the models are used to determine the expected number of crashes under each specific and combined conditions. The ratio of the expected number of crashes under a specific condition and the average condition is the CMF for that condition. CMF computation equation from Page 17 of the Guide is used to determine the CMFs. For example, "urban_interstate" has CMF 1.07 and "rural_interstate" has CMF 1.03.

Additionally, these crash factors can be expanded to other conditions such as flooding, work zone, road closures, public events etc., and the roadway features could also be expanded to surface type, intersection versus non-intersection, type of intersections, road curvature. Other driver-specific information illustrated in FIG. 2 can also be modeled by statistical distributions and characterized by CMF s.

The output of the Risk Assessment 516 is used as Road Risk Profile 70 as described in FIG. 1 A/B. The road risk profile is a database that contains all road segments of the area near the starting and end points and the area between the points. Each road segment has a segment ID, a beginning node (latitude, longitude pair), an ending node (latitude, longitude pair), baseline risk score from the Empirical Bayes weighted average calculation 524, segment length (in miles), estimated travel time (computed as segment length/speed limit), and a set of CMFs 526 for conditions, road features, and driver safety profile described above.

The final stage is Real Time Route Computing process 530, which may be executed by navigational platform 30 and/or routing server 50 in FIG. 1A/B. Using the data retrieved and fused during the Ingest/Fusion process and conditioned by the Risk Assessment process, the Real Time Route Computing process 530 uses this information as a factor to weigh safety considerations associated with various road segments that may be incorporated into suggested routes. Particularly, the process obtains the driver's present location (or origin) and the driver's intended destination 532, either directly from driver input, or the location is detected and computed from GPS tracking information. The process 530 additionally receives driver's tolerance level 534 as manually provided by the driver (or a default value if no customized values is provided) that may include the tradeoff between safety and travel time or distance.

The information concerning the driver's present location and destination 532 and the driver's tolerance level 534 are applied to a Routing Computation Engine 536. This engine applies data from 532 and 534, along with the Bayes weighted average baseline crash scores 522 from the Risk Assessment stage. Additionally, the routing algorithm 536 calculates a specific set of CMFs for each segment from the precomputed CMF database 524 from the Risk Assessment stage based upon the time of day and day of the week 538, the real time weather information 540, and the specific driver's safety profile, so that the Routing Computation Engine computes suggested routes based upon present and personalized conditions The Routing Computation Engine outputs an Optimal Route 550 that factors a safety risk score with the anticipated travel time of various routes. In some embodiments, the Optimal Route 550 is then applied to provide point-to-point directions. In other embodiments, the Optimal Route is provided as a suggested route, along with other routes from which the driver can make a selection.

Accordingly, the improved navigational system includes two components—safety assessment and safety-based routing. These components are not a mere data compiling or collection. Rather, the safety assessment uses a statistical inference method such as the Empirical Bayes method to combine historical accident data and statistical regression models that are based on roadway features to compute the likelihood of having an accident on a specific road segment (a road segment is considered as a portion of the road from one intersection to another). The routing further uses the accident data to fit statistical models to compute different crash modification factors (CMF s) to account for additional site-specific conditions such as rush hours, day/night, or severe weather conditions, that may differ from the average conditions. Lastly, it incorporates a driver's tolerance/preferences on travel time, travel distance, and travel time as multi-objective shortest path algorithm to determine the optimal routes. None of these features is believed to exist in current navigation systems.

In an example embodiment, the improved navigation system is configured to dynamically access road safety data associated with road segments that may be incorporated into suggested routes. The road safety data may be retrieved from a database schema maintained on a remote server, such as a schema described above and be processed by the Data/

Ingest/Fusion 502. For a given road segment, the navigation system may retrieve information including the number of accidents per year on that roadway (e.g., based upon police reports), the dates, times of day, and weather conditions when the accidents occurred, etc. Alternatively, or additionally, the database may include the dates, times of day, and/or severity for the accidents, and the navigation system may access a separate database of historical weather conditions and correlate the information to determine the corresponding weather condition for each accident. During the Real Time Route Computing 530, for example, if the navigation system determines that road segment "A" is part of the shortest route from a driver's present location to a target location, the navigation system can remotely retrieve road safety data for road segment "A" to evaluate whether the route containing that segment preferably is to be avoided for safety considerations, according to a driver's safety profile.

By correlating the road safety data for road segments in proposed routes with a driver's safety profile, such as a profile maintained in a schema as depicted in FIG. 2, the navigation system can determine whether certain routes include road segments that are associated with risks pertinent to the driver and should be avoided in favor of safer routes. For example, if the weather is dark and rainy, and there are known to be a significant number of accidents along road segment "A" when it is raining in the evening, and further, if the driver's safety profile indicates a history of accidents under similar conditions, the navigation system can be configured to account for this and suggest another route that does not include road segment "A" or avoids the road or plurality of roads that form that path. The navigation system instead may suggest a route that includes road segment "B," which may be associated with another safety risk (e.g., a difficult left turn) that does not correlate with any adverse events in the driver's safety profile.

The navigation system can associate the route with a safety score that is correlated with the driver's safety profile. For example, the navigation system can be configured to identify both the shortest route and a suggested "safer" route. Each route can be associated with a safety score, or factor, and an estimated travel time to aid the driver to select the most appropriate route for that trip. This enables the driver to weigh the differences in distance, estimated time of arrival, and the safety factor. With this information, the driver might favor on one route from another depending on, for example, whether the driver is running late for an appointment, has children in the vehicle, etc. As another option, the navigation system additionally includes information that was pertinent to the determination of the safety score. For example, if a road segment in a proposed route is deemed particularly dangerous because it is curvy and it is presently raining, the display on the navigation system can be configured to indicate that.

Figure 6:
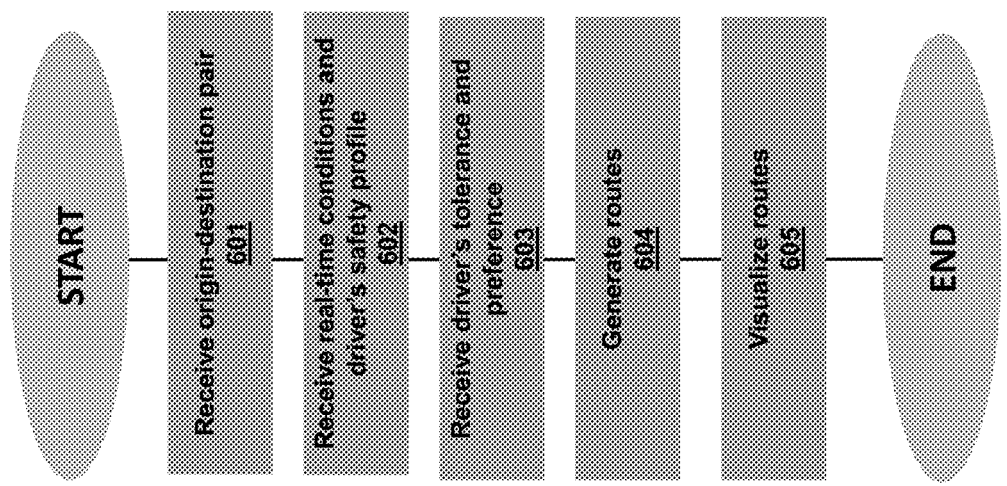
FIG. 6 is a flow diagram of a method for computing a navigational route that incorporates risk assessment information and a driver's risk profile, according to an embodiment of the present disclosure.

Consistent with the discussion above, and as depicted in FIG. 6, the following outlines in further detail the routing steps 600 after baseline risk score from 524 in FIG. 5 and CMFs have re-computed from 526 in FIG. 5.

At a step 601, origin-destination pair is received as a part of a request from a user (or a user's device). In some embodiments, the request may include a detected origin location associated with a user (e.g., the driver) or a user (e.g., driver) provided origin. The request may further include an intended destination location provided by the driver. In some embodiments, the algorithm converts the two locations (e.g., addresses) into two points with latitude and longitude and finds the closest nodes from the road network to the starting and ending points, respectively. In some embodiments, a user could also enter a name associated with the location instead of a specific address. A different API can be used to convert the name of location to a potential address for user to confirm.

Step 602. Obtain real-time conditions and driver's safety profile

In some embodiments, the user enters a preferred departure date and time. In Alternatively, or additionally, the current timestamp may be used as the departure date/time. Similarly, the user may enter the current (or desired) departure weather condition such as "sunny/clear", 'rain", "snow", "fog." Alternatively, or additionally, the algorithm will use the detected location/time (e.g. based on the GPS coordinate determined by the user's device) to determine the weather condition associated with the departure location. Based on the day/time/weather, for each road segment i of the road, the algorithm computes the real-time risk score of the given condition (e.g., weather) and departure time as follows:

$$Risk_i = Risk_{i,baseline} \times CMF_{i,day/night} \times CMF_{i,weather} \times CMF_{i,month}$$

where the risk baseline is the risk score of average conditions computed by the Empirical Bayes weighted average method and CMFs are pre-determined for each type of weather condition and varies by roadway features (as specified above, for example). Therefore, different real-time conditions will likely produce different risk score for the same road segment and same route.

The considered real-time conditions can be expanded to include other conditions such as driver's safety profile beyond the weather conditions.

Step 603. Retrieve user's tolerance and preference

The user can provide a route safety tolerance to travel time. For example, for a particular user, safety can be twice as important as travel time, just as important as travel time, or half as important as travel time.

Based on the user's tolerance, the algorithm will normalize the weight so that the weight for the travel time and the weight for the safety adds up to 100%

A default value can be set if a user did not provide any tolerance or preferences. Alternatively, as described above, the tolerance can be computed automatically based upon a driver's safety profile.

The user can also provide a preference of avoiding certain routes such as toll roads, work zone or school zoon or including certain routes such as highway in the suggested routes as describe above in FIG. 5.

Step 604. Generate Routes

After computing the real-time risk score for each segment using the equation above, the database can be converted into a direct graph with nodes and edges and attributes associated to each edge. The attributes include real-time risk score, segment length, segment travel time.

The Dijkstra-algorithm based shortest path such as the one from the Python library networkX could be used to compute the safest route (based on the risk score as measured in cost), fastest route (i.e., based on the expected travel time), shortest route (i.e., based on the distance). The risk score, travel distance, and travel time for each route is also computed.

Step 605. Visualize Routes

At step 605, the system presents, to the user (e.g., driver) via a user device, the optimal route as well as the safest route, the fastest route, and the shortest route. For example, the routes may be overlaid on a map displayed on the user device, displaying the associated risk score, travel distance, and travel time proximate to each route (see e.g., FIG. 4).

Once the user (e.g., driver) selects a route, a turn-by-turn navigation may be initiated.

Figure 7:
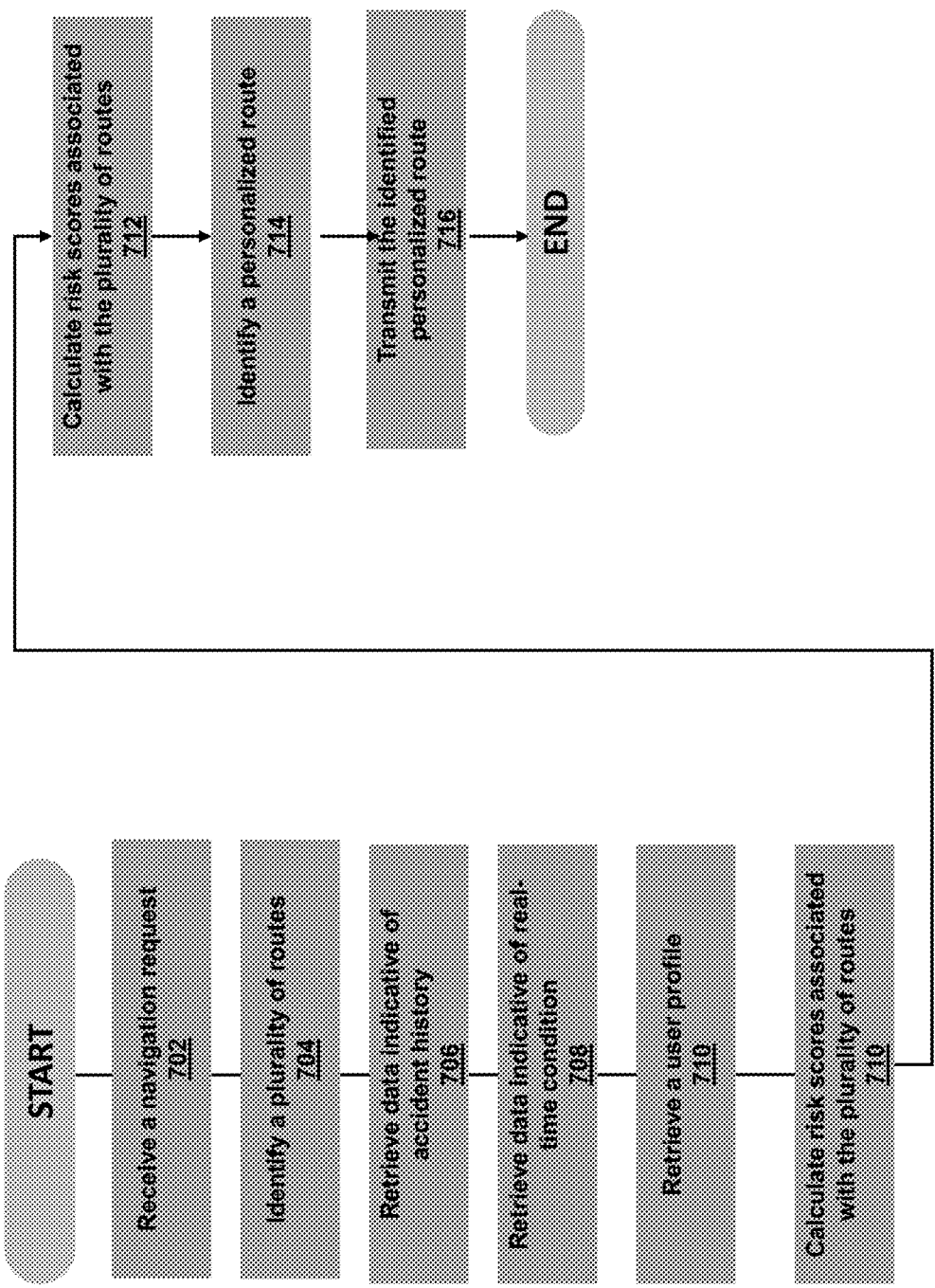
FIG. 7 is another flow diagram of a method for computing a navigational route that incorporates risk assessment information and a driver's risk profile, according to an embodiment of the present disclosure.

FIG. 7 illustrates an example process for a personalized vehicular navigation assessed dynamically based on risk tolerance in accordance with some embodiments.

At a step, 702, a navigation server may receive a navigation request from a user (e.g., driver via his/her mobile device). The request includes a destination location input by the user. The origin location associated with the user may also be provided as input by the user or detected, for example, by the user's mobile device.

At a step 704, the navigation server may identify a plurality of routes from the origin to the destination. A route includes a plurality of road segments.

At a step 706, the navigation server may retrieve data indicative of accident history associated with at least one of the road segments. The accident history may be retrieved as part of accident records 320 of FIG. 3, for example.

At a step 708, the navigation server may retrieve data indicative of real-time condition of the road segments.

At a step 710, the navigation server may retrieve a user profile associated with the user. The user profile includes a user-configurable tolerance level (e.g., as a part of driver preferences and tolerances 250 of FIG. 2) and a driver's history that factors experience and past traffic incidents (e.g., as a part of responses to profile questionnaires 210 and accident records 220).

At a step 712, the navigation server may calculate risk scores, based on the accident history and the real-time condition and weighed based on tolerance level and the driver's history, associated with a plurality of proposed routes.

At a step 714, the navigation server may identify a personalized route based on the risk score.

At a step 716, the navigation server may transmit the identified personalized route to the device. In some embodiments, the navigation server may further transmit other routes identified at step 704 but with an indication of the identified personalized route among them. In response, the device may display a GUI, such as the example of FIG. 4.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. A method, to be performed on a server, for personalized vehicular navigation assessed dynamically based on risk tolerance, comprising:
receiving a navigation request from a user, wherein the request includes destination data and a detected origin location associated with the user;
identifying a plurality of routes from the origin to the destination, wherein a route is comprised of a plurality of road segments;

retrieving data indicative of a real-time condition associated with at least one of the road segments;

retrieving data indicative of accident history associated with the at least one of the road segments;

retrieving a user profile associated with the user, wherein the user profile includes at least one of a user-configurable tolerance level and driver's history that factors experience and past traffic incidents, calculating risk scores, based on the accident history and the real-time condition and weighed based on the at least one tolerance level and driver's history, associated with a plurality of proposed routes, wherein the calculation includes combining, using a statistical inference method, the accident history and a statistical regression model based on features of a road segment to compute a likelihood of having an accident on the road segment; and generating a plurality of personalized route suggestions based on the risk scores;

transmitting data to a graphical user interface of a client device to display a plurality of the generated personalized route suggestions on the screen of the client device;

in response to receiving a request for more information about a personalized route suggestion, transmitting data for display on the graphical user indicating a potential safety concern associated with the risk score and its corresponding location on the suggested route; and in response to receiving a selection from the user of one of the personalized routes. generating data for the graphical user interface of the client device, including a warning to be provided once the driver is at a location along a roadway that is a basis for negatively impacting the risk score for the route.

2. The method of claim 1, wherein the risk scores are calculated based on a portion of the data indicative of accident history associated with a time period.

3. The method of claim 2, wherein the time period is determined based on a present time or start time received from the user device.

4. The method of claim 1, further comprising retrieving data associated with a weather condition, wherein the risk scores are calculated based on a portion of the data indicative of accident history associated with a weather condition.

5. The method of claim 1, wherein the driver's history includes at least one of the driver's age, age group, gender, knowledge of the local roads, driving skill level, driving experience, and a combination thereof.

6. The method of claim 1, wherein generating the personalized route is further based on a route distance, a travel time, or a combination thereof.

7. The method of claim 1, further comprising generating at least one route from the plurality of routes other than the identified personalized route.

8. A server-based navigation system for personalized routing, comprising:

one or more processors in a server configured to:

receive a navigation request from a user, wherein the request includes destination data and a detected origin location associated with the user;

identify a plurality of routes from the origin to the destination, wherein a route comprises a plurality of road segments;

retrieve data indicative of accident history associated with at least one of the road segments;

retrieve data indicative of a real-time condition of the road segments;

retrieve a user profile associated with the user, wherein the user profile includes at least one of a user-configurable tolerance level and driver's history that factors experience and past traffic incidents;

calculate risk scores, based on the accident history and the real-time condition and weighed based on the at least one tolerance level and the driver's history, associated with a plurality of proposed routes, wherein the calculation includes combining, using a statistical inference method , the accident history and a statistical regression model based on features of a road segment to compute a likelihood of having an accident on the road segment;

identify a personalized route based on the risk scores; and generate a plurality of personalized route suggestions based on the risk scores transmit data to a graphical user interface of a client device to display a plurality of the generated personalized route suggestions on the screen of the client device;

in response to receiving a request for more information about a personalized route suggestion, transmit data for display on the graphical user indicating a potential safety concern associated with the risk score and its corresponding location on the suggested route; and in response to receiving a selection from the user of one of the personalized routes. generate data for the graphical user interface of the client device, including a warning to be provided once the driver is at a location along a roadway that is a basis for negatively impacting the risk score for the route.

9. The system of claim 8, wherein the risk scores are calculated based on a portion of the data indicative of accident history associated with a time period.

10. The system of claim 9, wherein the time period is determined based on a start time received from the user device.

11. The system of claim 8, wherein the risk scores are calculated based on a portion of the data indicative of accident history associated with a weather condition.

12. The system of claim 8, wherein the driver's history includes the driver's age, age group, gender, knowledge of the local roads, driving skill level, driving experience, or a combination thereof.

13. The system of claim 8, wherein generating the personalized route is further based on a route distance, a travel time, or a combination thereof.

14. The system of claim 8, wherein the processors are further configured to generate at least one route from the plurality of routes other than the identified personalized route.

15. A non-transitory computer-readable storage medium storing code that, when executed, causes a computer to perform the steps of:

receiving, by a server, a navigation request from a user, wherein the request includes destination data and a detected origin location associated with the user;

identifying, by a server, a plurality of routes from the origin to the destination, wherein a route comprises a plurality of road segments;

retrieving, by a server, data indicative of accident history associated with at least one of the road segments;

retrieving, by a server, data indicative of real-time condition of the road segments;

retrieving, by a server, a user profile associated with the user, wherein the user profile includes a user-configurable tolerance level and a driver's history that factors experience and past traffic incidents, calculating, by a server, risk scores, based on the accident history and the real-time condition and weighed based on tolerance level and the driver's history, associated with a plurality of proposed routes, wherein the calculation includes combining, using a statistical inference method, the accident history and a statistical regression model based on features of a road segment to compute a likelihood of having an accident on the road segment; and generating, by a server, a plurality of personalized route suggestions based on the risk scores transmitting data to a graphical user interface of a client device to display a plurality of the generated personalized route suggestions on the screen of the client device;

in response to receiving a request for more information about a personalized route suggestion, transmitting data for display on the graphical user indicating a potential safety concern associated with the risk score for the route and its corresponding location on the suggested route; and in response to receiving a selection from the user of one of the personalized routes generating data for the graphical user interface of the client device, including a warning to be provided once the driver is at a location along a roadway that is a basis for negatively impacting the risk score for the route.

16. The medium of claim 15, wherein the risk scores are calculated based on a portion of the data indicative of accident history associated with a time period.

17. The medium of claim 16, wherein the time period is determined based on a start time received from the user device.

18. The medium of claim 16, wherein the risk scores are calculated based on a portion of the data indicative of accident history associated with a weather condition.

19. The medium of claim 16, wherein generating the personalized route is further based on a route distance, a travel time, or a combination thereof.

20. The medium of claim 15, wherein the driver's history includes the driver's age, age group, gender, knowledge of the local roads, driving skill level, driving experience, or a combination thereof.

* * * * *